United States Patent
Onic et al.

(10) Patent No.: US 11,279,843 B2
(45) Date of Patent: Mar. 22, 2022

(54) DEXTRIN-BASED COATING SLIPS

(71) Applicant: ROQUETTE FRERES, Lestrem (FR)

(72) Inventors: Ludivine Onic, Lestrem (FR); Christian Bouxin, Marquillies (FR); Timo Pajari, Espoo (FI); Patrick Dauchy, La Couture (FR)

(73) Assignee: Roquette Freres, Lestrem (FR)

(*) Notice: Subject to any disclaimer, the term of this patent is extended or adjusted under 35 U.S.C. 154(b) by 167 days.

(21) Appl. No.: 16/715,974

(22) Filed: Dec. 16, 2019

(65) Prior Publication Data

US 2020/0140715 A1  May 7, 2020

Related U.S. Application Data

(63) Continuation of application No. 14/785,998, filed as application No. PCT/FR2014/050975 on Apr. 22, 2014, now abandoned.

(30) Foreign Application Priority Data

Apr. 24, 2013 (FR) .................................. 13 53742

(51) Int. Cl.
| | | |
|---|---|---|
| *C09D 103/02* | (2006.01) | |
| *C08L 3/02* | (2006.01) | |
| *D21H 17/24* | (2006.01) | |
| *D21H 19/54* | (2006.01) | |
| *D21H 17/28* | (2006.01) | |
| *D21H 19/82* | (2006.01) | |
| *D21H 19/44* | (2006.01) | |
| *C08K 3/26* | (2006.01) | |
| *C08K 3/34* | (2006.01) | |

(52) U.S. Cl.
CPC .............. *C09D 103/02* (2013.01); *C08L 3/02* (2013.01); *D21H 17/24* (2013.01); *D21H 17/28* (2013.01); *D21H 19/44* (2013.01); *D21H 19/54* (2013.01); *D21H 19/82* (2013.01); *C08K 3/26* (2013.01); *C08K 3/346* (2013.01); *C08K 2003/265* (2013.01)

(58) Field of Classification Search
None
See application file for complete search history.

(56) References Cited

U.S. PATENT DOCUMENTS

| | | | |
|---|---|---|---|
| 6,054,302 A | 4/2000 | Shi et al. | |
| 6,613,152 B1 * | 9/2003 | Maas | C08B 30/18 127/38 |
| 2007/0289486 A1 * | 12/2007 | Apostol | D21C 5/02 106/31.39 |
| 2010/0159263 A1 * | 6/2010 | Ahlgren | D21H 19/58 428/514 |
| 2011/0229700 A1 * | 9/2011 | Troutman | C08B 31/04 428/195.1 |
| 2013/0040158 A1 * | 2/2013 | Marakainen | C09D 103/02 428/533 |

FOREIGN PATENT DOCUMENTS

FR  2982886 A1  5/2013

* cited by examiner

*Primary Examiner* — Chinessa T. Golden

(57) ABSTRACT

A coating slip including at least one pigment, water and: between 30% and 90% by weight of dextrin (A) of at least one dextrin having a weight-average molecular weight $M_A$ of less than 500 kDa; between 10% and 70% by weight of dextrin (B) of at least one dextrin having a weight-average molecular weight $M_B$; the weight amounts of dextrins being relative to the total amount of the mixture of dextrins (A) and (B) in the composition, characterized in that $M_B$ is greater than $M_A+50$ kDa. Also, a process for coating paper including a step of coating with this slip, and also to the paper obtained at the end of this process.

17 Claims, No Drawings

DEXTRIN-BASED COATING SLIPS

CROSS-REFERENCE TO RELATED APPLICATIONS

This application is a Continuation of application Ser. No. 14/785,998, filed Oct. 21, 2015, which is a National Stage Application of PCT/FR2014/050975 filed Apr. 22, 2014, which claims priority from French Patent Application No. 13 53742, filed on Apr. 24, 2013. Each of prior mentioned applications is hereby incorporated by reference herein in its entirety.

FIELD OF THE INVENTION

A subject matter of the invention is a composition capable of being used in the coating of paper, comprising mixtures of dextrins, of different molecular weights.

STATE OF THE ART

In the paper and cardboard industry, numerous different grades of products exist. Paper and cardboard of high quality, for example those used in magazines or also information leaflets, are generally coated paper or cardboard, combined together under the term "coated paper" in the present patent application.

A coated paper is a paper, the surface of which is covered with one or more "coatings", generally based on pigments mixed with binders and various additional products.

These coatings are applied by a coating process which is carried out using aqueous compositions known as "coating colors". The aim of this operation is to render the rough and macroporous surface of the paper or cardboard, into an even and microporous face, in order to make possible better reproduction of the printing.

Furthermore, it is possible, by this operation, to bring about an improvement in the whiteness, gloss or feel of the printed paper.

Coated paper also has to exhibit a good wet pick resistance, which can be determined by an IGT (Institut voor Graphisce Technieck) device. This property is very important in the field of coated paper as it makes it possible to obtain a good printing quality, in particular in the case of offset printing. This is because, during the printing process, successive applications of different colored greasy inks are carried out on the paper. In order to have well defined printing, inking rollers, which act as mould, are covered with regions of greasy ink and with regions of wetting water, which is a composition with an aqueous base, which will prevent this greasy ink from printing the paper. The presence of water on the roller thus makes it possible to delimit the regions to be printed. This water will thus moisten the paper during the printing process. The ink is then applied to a slightly wet paper and it is thus necessary for the coating to be resistant to this moisture in order for the printing to be of quality.

In order to produce the coated paper, one or more fine coatings of coating color is/are applied and is/are dried on the paper. Industrially, this composition is applied by continuous coating on a paper, generally by film press or blade coating techniques. The thickness of the coating can be regulated by adjusting the pressure and the speed of forward progression of the paper and, in the case of film press, the threading of the rods used.

This coated paper or cardboard can subsequently be used in printing processes, for example of offset, heliogravure, rotogravure, lithogravure, inkjet or flexography type.

In the coating color, the binders have the role of causing the pigments to stick to one another in the coating obtained and of causing the coating to adhere to the paper. This coating is obtained after drying the said color during the process of coating the paper.

The amounts of pigments in the color are generally very high (generally greater than 50% of the solids content of the color). Furthermore, this color generally comprises fairly limited amounts of water, generally less than 60%, indeed even less than 50%, by total weight of the coating color. This is because, as the coating is obtained by drying the color applied during the coating process, it is thus advantageous for the amount of water in the color to be low in order to easily evaporate the water and thus to be able to rapidly obtain the coated paper, while using little energy in order to remove this water.

At the same time, it is also necessary for the viscosity of the coating color not to be excessively high, despite the small amount of water included in the color. This makes it possible to easily apply the color: if the latter is not fairly fluid, it is then necessary to slow down the coating process in order to obtain a coating having the desired thickness.

The binders generally used in the colors are styrene polymers, generally of styrene-butadiene or styrene-acrylate type, which are used in the form of dispersions in water, otherwise known as latexes. These latexes are fluid, which makes it possible to manufacture colors having a rheological behavior very well suited to the process of coating on paper.

Furthermore, the properties of the paper obtained are excellent, which is explained by an excellent adhesion of the fillers to one another and by very good bonding of the coating to the paper.

The printability and the strength of the coated paper obtained are furthermore excellent.

However, these dispersions can be relatively unstable depending on the storage conditions. Their storage cannot be carried out in dry form, which involves, due to the presence of water, additional transportation costs. Furthermore, they are produced from non-renewable petroleum resources. These dispersions can also be relatively expensive. Finally, the coating colors comprising solely conventional styrene dispersions as binder exhibit a poor water retention, that is to say that water has to be continuously added to the color during the process in order for this color to retain its initial viscosity and to thus maintain good machineability during the process. It is also possible to add agents which improve the water retention; however, these agents are not completely satisfactory or can exhibit a not insignificant additional cost for the coating color.

Thus, in order to solve these problems, it has been proposed for some years to replace these dispersions, in full or in part, with products of renewable origin. These products can be starches or starch derivatives, for example dextrins and/or native starches.

The document WO 2008/074957 describes the use of modified starch in the manufacture of coating compositions exhibiting a high molecular weight and a specific sol/gel transformation temperature. These modified starches are sparingly soluble at ambient temperature. They are subjected to a stage of cooking in a Jet-Cooker in aqueous solution before use. The result of this is an aqueous composition having a fairly high solids content, which is used to manufacture the coating composition, this composition being more fluid than those prepared from conventional modified starches. The properties of the coated paper obtained are entirely satisfactory.

However, even if the problems of high viscosity and of dry weight of the coating composition are partially solved, it still remains necessary to improve them.

The application WO 2011/131330 A1 for its part describes a coating color comprising an amylaceous mixture composed of a degraded starch and of a native starch. It is indicated that this color makes it possible to obtain good properties for the paper obtained (gloss, pick resistance) and also makes it possible to facilitate the transformation process as a result of improved properties of the color, in particular in terms of viscosity and of water retention.

However, these improvements are still too limited and there still exists a need to improve the coating processes and the properties of the coated paper thus obtained and to find novel colors which make these improvements possible.

It is to the credit of the applicant company to have arrived at novel compositions, entirely suited to being used as colors in coating processes.

SUMMARY OF THE INVENTION

The subject matter of the invention is thus a coating color comprising at least one pigment, water and:
- between 30 and 90% by weight of dextrin (A) composed of at least one dextrin with a weight-average molecular weight $M_A$ of less than 500 kDa;
- between 10 and 70% by weight of dextrin (B) composed of at least one dextrin with a weight-average molecular weight $M_B$;

the amounts by weight of dextrins being with respect to the total amount of the mixture of dextrins (A) and (B) in the composition, characterized in that $M_B$ is greater than $M_A$+50 kDa.

This color makes it possible to obtain paper of excellent quality, equaling, indeed even improving, the qualities of the coated paper obtained from the starch-based coating colors of the prior art, in particular in terms of gloss.

Furthermore, these colors exhibit an improved water retention capacity, making it possible to maintain the machinability during the coating process.

DETAILED DESCRIPTION OF THE INVENTION

Coating color is understood to mean an aqueous composition for the surface treatment of paper comprising a pigment and a binder.

It can be of use for the pigmented coating or surfacing of paper.

The coating color according to the invention comprises at least one dextrin (A) and at least one dextrin (B), that is to say a mixture of dextrins (A) and (B).

Dextrins are generally manufactured from starch using processes employing the action of heat, in a dry or non-dry medium, in the presence or absence of chemical agent. For the most part, whether batchwise or continuous, these processes involve transformation temperatures of greater than 100° C. and the optional presence of an acid, of an alkaline agent and/or of an oxidizing agent.

Dextrins are generally classified into three categories bringing together:
white dextrins, generally obtained by transformation of the starch at temperatures often of between 120 and 170° C., in the presence of chemical agent(s), in particular of acid, in relatively high amounts,
yellow dextrins, often manufactured by transformation of the starch at higher temperatures, generally between 170 and 230° C., in the presence of chemical agent(s), in particular of acid,
dextrins, known as "British Gum", obtained by the action of heat alone, at high temperature, often of greater than 230° C.

The dextrinization processes generate different reactions. The importance of each of these reactions varies according to the conditions of the process, such as the nature and the amount of chemical agent used, the water content during the reaction, the temperature profile and the reaction time. A person skilled in the art generally considers that various mechanisms can be produced during the reaction for the dextrinization of starch. The hydrolysis reaction is significant at the start of the transformation, this being the case from 50° C. Related to the presence of acid and of an amount of water which is still sufficient, it reduces the molecular weight. The condensation or reverse reaction forms an α(1,6) bond from a primary alcohol of one chain and the reducing end of another chain. It is promoted by temperatures of less than or close to 150° C. The "transglucosidation" reaction, forming an α(1,6) bond while cleaving an α(1,4) bond without releasing water, is predominant at temperatures of greater than 150° C. As it makes it possible to obtain more branched molecules, it is essential to the expression of the properties of the dextrins, in particular yellow dextrins. Other reactions also take place, such as internal "anhydridization", between carbons 1 and 6, or the recombination resulting from the reaction between a reducing end and a $C_2$, $C_3$ or $C_4$ hydroxyl group. The relative importance of these phenomena confer specific properties on the dextrins. In the transformation of white dextrins, the predominant mechanism is hydrolysis. The result of this is that these white dextrins exhibit either a high molecular weight with a low solubility in water or the reverse. In the case of yellow dextrins, hydrolysis is important and all the mechanisms described above have an equal importance, which results in products of low molecular weight, generally rebranched, exhibiting a high solubility in water.

The dextrins of use in the composition according to the invention exhibit specific characteristics of molecular weight. These characteristics thus result from the competition of the different complex reaction mechanisms described above.

It is possible, in order to produce the coating color according to the invention, to use dextrins of any type, as long as these dextrins exhibit the specific molecular weight of the dextrins (A) and (B) of use in the invention.

As regards the molecular weight (M) of the dextrin (A) or of the dextrin (B), it is expressed in daltons (Da) and can be determined by a person skilled in the art using size-exclusion chromatography of HPSEC-MALLS (High Performance Size Exclusion Chromatography coupled on-line with Multiple Angle Laser Light Scattering) type.

This weight can be measured by size-exclusion chromatography according to the following protocol:
preparation of a sample by dissolution of the dextrin, by heating at 100° C. for 30 min in a dilution solvent composed of a DMSO/NaNO₃ mixture (0.1M NaNO₃ in DMSO), it being possible for said sample to exhibit a concentration ranging from 2 to 10 mg of starch per ml of dilution solvent;
use of a high performance liquid chromatography (HPLC) device equipped with a pump, operating in isocratic mode, which causes an elution solvent to circulate at 0.3 ml/min, with a refractometer, with a laser multiple angle light scattering detector having 18 angles which is heated to 35° C., for example a DAWN HELEOS detector from Wyatt, and with an oven for thermostatic control of the columns heated to 35° C., for example equipped with polyhydroxymethacrylate columns of Suprema type for which the elution solvent is, for example, a 0.1M aqueous sodium nitrate solution comprising 0.02% by weight of sodium azide;

injection into the device of a sample volume of approximately 100 µl.

The weight-average molecular weights can be determined from the spectra obtained, for example by reprocessing the spectra as exponential 1$^{st}$ order, using analytical software of Astra v.5 type.

The dextrin (A) is composed of at least one dextrin with a weight-average molecular weight $M_A$ of less than 500 kDa. It can thus also be composed of a mixture of dextrins, each one of which exhibits this weight-average molecular weight characteristic. Advantageously, $M_A$ is between 5 kDa and 400 kDa, preferably between 10 kDa and 350 kDa and very preferably between 100 kDa and 300 kDa.

The dextrin (A) can be obtained from starch extracted from cereals, such as wheat, corn, barley, triticale, sorghum or rice, from tuberous plants, such as potato or cassava, or from leguminous plants, such as peas and soya, and from mixtures of such starches. It can also be waxy starch or, on the contrary, starch rich in amylose of the abovementioned starches.

Preferably, the dextrin is obtained from corn, wheat, potato or pea starch, very preferably from corn starch.

The dextrin (B) is composed of at least one dextrin with a weight-average molecular weight $M_B$ Of greater than $M_A+50$ kDa. It can thus also be composed of a mixture of dextrins, each one of which exhibits this weight-average molecular weight characteristic.

By way of example, if the coating color according to the invention comprises a dextrin (A) with a weight $M_A$ equal to 300 kDa, the coating color additionally comprises at least one dextrin (B) with a weight $M_B$ of greater than 350 kDa.

Advantageously, $M_B$ is between 550 kDa and 5000 kDa, preferably between 550 kDa and 3000 kDa. It is preferably greater than 600 kDa and preferably greater than 1000 kDa. It is advantageously less than 2500 kDa. Very preferably, the weight-average molecular weight is between 1000 kDa and 2500 kDa.

The dextrin (B) can be obtained from starch extracted from cereals, such as wheat, corn, barley, triticale, sorghum or rice, from tuberous plants, such as potato or cassava, or from leguminous plants, such as peas and soya, and from mixtures of such starches. Preferably, the dextrin (B) is a waxy dextrin, that is to say a dextrin obtained from a waxy starch. A waxy starch generally comprises amounts of amylopectin ranging from 90 to 100% by weight, these amounts being expressed as dry weight of amylopectin with respect to the dry weight of starch, advantageously from 95 to 100%, very often ranging from 98 to 100%. This percentage can be determined by colorimetry using an iodine assay.

The waxy starch can in particular be obtained from corn, wheat, barley or potato. Very preferably, the waxy starch is a waxy corn starch.

The dextrins (A) and (B) may or may not be hydrosoluble.

Generally, the dextrin (A), with a lower molecular weight, will be highly soluble in water, whereas the dextrin (B), with a greater molecular weight, is sparingly soluble. However, it is also possible to use, as dextrin (B), the soluble dextrin of the application PCT/FR2012/052651. Hydrosoluble dextrin according to the present patent application is understood to mean a dextrin exhibiting an aqueous solubility of greater than or equal to 50%, measured at 22° C. at a concentration of dry starch of 25 g/l of water, as described in test A of the abovementioned patent application.

Many processes for the manufacture of dextrins are known from the prior art and the dextrins of use in the invention are long-standing commercial products. Mention may be made, by way of example, of the dextrins sold by the applicant company under the Stabilys® brand.

The coating color according to the invention comprises between 30 and 90% by weight of dextrin (A) and between 10 and 70% by weight of dextrin (B), with respect to the total amount of the mixture of dextrins (A) and (B) in the color.

Preferably, the amount by weight of dextrin (A) is between 50 and 85% and the amount by weight of dextrin (B) is between 15 and 50%. Very preferably, the amount by weight of dextrin (A) is between 70 and 80% and the amount by weight of dextrin (B) is between 20 and 30%.

According to a very particularly preferred form, the color comprises, with respect to the total amount of the mixture of dextrins (A) and (B) in the color, between 70 and 80% of an amount by weight of dextrin (A) exhibiting an $M_A$ of between 10 and 30 kDa and between 20 and 30% of an amount by weight of waxy dextrin (B) exhibiting an $M_B$ of between 1000 kDa and 2500 kDa.

In addition to the dextrins described above, the coating color additionally comprises water and one or more pigments.

The coating color can comprise, in addition to the water, optionally small amounts of at least one other solvent, such as an alcohol, but it is preferable for the solvent of the color to be composed of water. The solids content of the color consists of the ingredients of the color, with the exclusion of the solvents.

The coating color advantageously exhibits a solids content of between 40 and 85%, preferably between 50 and 75% and indeed even between 55 and 73%.

Examples of appropriate pigments comprise clays, such as kaolin, but also calcined clays, hydrated aluminum silicates, bentonite, calcium carbonate, calcium sulfate or gypsum, silicas, in particular precipitated silicas, titanium dioxide, alumina, aluminum trihydrate, plastic pigments, such as those made of polystyrene, satin white, talc, barium sulfate, zinc oxide and mixtures of two or more.

The pigments are preferably kaolin, calcium carbonate, talc or the mixtures of these pigments.

The appropriate pigment or pigments can be easily selected by a person skilled in the art according to the type of coating color to be obtained. To prepare the coating color according to the invention, the pigment can be added in the form of a dispersion of the pigment in water.

The coating color can also comprise one or more additional polymers having the role of binder, other than the dextrins (A) and (B). This additional polymer can be a polymer chosen from styrene polymers, for example a styrene/butadiene, styrene/acrylate or styrene/butadiene/acrylate copolymer, polymers of (meth)acrylic type or of (meth)acrylate type, saponified or nonsaponified polyvinyl acetates, starches other than the dextrins (A) and (B), and protein binders, such as casein, gelatin, or soya proteins. Preference is given, as additional polymer, to a polymer chosen from styrene polymers.

These additional polymers can advantageously be introduced into the composition via a dispersion in water.

The coating color according to the invention can comprise, per 100 parts of pigments, from 0.5 to 200 parts of the mixture of dextrins (A) and (B) and optionally from 0 to 100 parts of additional polymer, the sum of the parts of dextrins (A) and (B) and of additional polymer ranging from 0.5 to 200 parts and advantageously from 2 to 30 parts, for example from 3 to 20 parts.

It is specified that the number of parts of the mixture of dextrins (A) and (B) is the sum of the parts of dextrin (A) and of the parts of dextrin (B).

Advantageously, the coating color comprises, per 100 parts of pigments, from 0.5 to 25 parts of the mixture of dextrins (A) and (B) and from 0 to 20 parts and preferably from 1 to 15 parts of additional polymer, the sum of the parts of the mixture of dextrins (A) and (B) and of additional polymer ranging from 2 to 30 parts, preferably from 3 to 20 parts.

Very preferably, the coating color comprises, per 100 parts of pigments, from 0.5 to 10 parts of the mixture of dextrins (A) and (B) and from 2 to 10 parts of additional polymer, the sum of the parts of the mixture of dextrins (A) and (B) and of additional polymer ranging from 3 to 20 parts.

The coating color generally comprises a pH regulator, for example a base, such as sodium hydroxide, indeed even an acid, such as hydrochloric acid.

The pH of the color, which generally ranges from 8 to 10.5, preferably of between 8.5 and 10, is adjusted by adding selected amounts of pH regulator.

The coating color can also comprise additives conventionally used in coating colors. Mention may be made, as examples of additives, of thickeners. Examples of appropriate thickeners comprise synthetic thickeners or thickeners of natural origin, such as cellulose ethers, for example carboxymethylcellulose (CMC), hydroxyethylcellulose, hydroxypropylcellulose, ethylhydroxyethylcellulose or methylcellulose, alginates, such as sodium alginate, xanthan gum, carrageenans and galactomannans, such as guar gum.

Other additives which can be used are surfactants, for example cationic surfactants, anionic, nonionic or amphoteric surfactants, and fluorinated surfactants.

Hardeners can also be used, such as, for example, active halogen compounds, vinyl sulfone compounds or epoxy compounds.

Dispersing agents, such as polyphosphates, polyacrylates or polycarboxylates, can also be used.

Mention may be made, as examples of additives which can also be included in the coating color of the invention, of agents which improve the fluidity, lubricants, antifoaming agents, optical brighteners, preservatives, such as, for example, benzisothiazolone and isothiazolone compounds, or biocidal agents, such as, for example, sodium metaborate, thiocyanate and benzoate.

Other additives which may be mentioned are also yellowing inhibitors, such as sodium sulfonate derivatives, ultraviolet absorbents or antioxidants.

Agents for resistance to water, which can be chosen from ketone resins, anionic latexes or glyoxal, and/or wet or dry strength agents, such as glyoxal-based resins, polyethylene oxides, or melamine or urea-formaldehyde resins, can also be used. Crosslinking agents, additives for retaining the gloss of the ink or additives for resistance to greases and oil can also be included in the coating color of the invention.

A person skilled in the art can select the additives in order to obtain the coating color and the paper having the desired properties. The coating color can comprise, per 100 parts of pigments, from 0 to 10 parts of additives, for example from 0.1 to 5 parts of additives.

A person skilled in the art can easily select the amounts of each of the constituents in order to have the viscosity which will make it possible to apply the composition to the paper in a satisfactory way during the coating process. For example, the coating color according to the invention exhibits a Brookfield viscosity ranging from 500 to 2000 mPa·s, for example between 600 and 1200 mPa·s, preferably between 600 and 900 mPa·s, and/or a Hercules viscosity ranging from 40 to 90 mPa·s and/or an ACAV viscosity ranging from 30 to 80 mPa·s. The Brookfield viscosity can be measured using a viscometer having the Brookfield brand, the rotational speed of the spindle of which is 100 revolutions/minute. The Hercules viscosity can be measured using a viscometer having the Hercules brand, the rotational speed of the spindle of which is 4400 revolutions/minute, equipped with an "E" bob. The ACAV viscosity can be measured at a shear rate of $1\,000\,000$ s$^{-1}$. The viscosity of the color increases mainly with the solids content, the amount of pigments and the amounts of starch, of additional polymer and of thickener.

The invention also relates to a process for the manufacture of coating color according to the invention, comprising at least one stage of mixing the constituents of the color.

The process for the manufacture of the coating color generally comprises:
  a stage of prior dissolution of the dextrins (A) and/or (B), for example by cooking in the presence of water,
  followed by a stage of mixing said dissolved dextrin(s) with the pigments, the water and the optional additional polymers, pH regulators and additives.

According to the alternative form where the dextrins (A) and (B) are hydrosoluble dextrins, it is also advantageous to produce the coating color without a stage of prior cooking of the dextrins, that is to say by simple mixing of the dextrins (A) and (B), the pigments, the water and the optional additional polymers, pH regulators and additives.

According to this alternative form, it is also possible to carry out the stage of dissolution of the dextrins (A) and (B) not by cooking but by simple mixing in water.

When a stage of cooking a starch is carried out, this stage can be carried out in a Jet-Cooker or batchwise, for example at a temperature between 70 and 160° C. Generally, the cooking of a starch is carried out in aqueous solution, this aqueous solution exhibiting, for example, a percentage by weight of starch ranging from 10 to 40%.

Another subject matter of the invention is a process for coating paper, comprising at least one stage of coating a paper with the color according to the invention, for example from 1 to 5 stages, in particular from 2 to 3 stages.

The coating process according to the invention exhibits the advantage of being able to use greater coating rates than some starch-based coating colors of the prior art, which makes it possible to increase the productive output of the paper coating processes.

According to the invention, the term "paper" encompasses any type of paper or cardboard capable of being subjected to a coating treatment.

The coating of the paper can be carried out in line in the papermaking machine or on a separate coating machine.

Depending on the quality of the paper or cardboard desired and its final use, it can be coated on just one or both sides. Each side can be coated just once or several times, on one or both sides, provided that at least one of the coating layers is produced from the coating color according to the invention.

According to a particularly advantageous form of the invention, the upper coating, that is to say the coating in contact with the environment or also that which is intended to be printed, is obtained from the coating color according to the invention.

This is because the coating obtained from the composition according to the invention exhibits a high mechanical strength and is particularly glossy, in comparison with the starch-based coating colors of the prior art.

To produce a coating, first of all a covering stage is carried out, followed by a drying stage.

The paper-covering stage according to the invention can be carried out by any covering process known to a person skilled in the art. It can be carried out, for example, by air-knife coating, pencil coating, smooth rod coating, threaded rod coating, spray coating, knife coating, curtain coating, size press coating, film press coating, brush coating, cast coating, gravure coating, jet applicator coating, short dwell coating, slide hopper coating, flexographic coating and reverse roll coating.

After the covering stage, the coating is obtained by a drying stage. This drying stage can be carried out by drying with air, by convection, by contact or by radiation, for example by infrared radiation.

Optionally, the coating process can comprise a calendering stage, which makes it possible to increase the gloss of the coated paper and the smoothness. The calendering stage is generally carried out by passing the covered and dried paper through a calender or between rollers which are generally covered with elastomers. For better results, the calendering can be carried out with heated rollers.

Another subject matter of the invention is a coated paper obtained from the coating process of the invention.

The paper of the invention exhibits excellent properties, in particular a wet strength which is superior to those of the coated papers obtained from starch-based coating colors of the prior art.

Each coating obtained by the process of the invention can comprise an amount of material ranging from 1 to 30 $g/m^2$, for example from 4 to 25 $g/m^2$ and preferably from 6 to 20 $g/m^2$.

The coated paper can comprise from 1 to 5 coating layers, for example from 2 to 3 coating layers, at least one of which is obtained from the coating color according to the invention.

Due to its superior properties, the coated paper according to the invention can advantageously be used in a printing process, such as, for example, printing of offset, heliogravure, rotogravure, lithogravure, inkjet or flexography type, preferably of offset or heliogravure type.

In order to illustrate and to show the advantages of the present invention, papers were manufactured from coating colors according to the invention and comparative colors in the examples which follow.

EXAMPLES

Example 1: Manufacture of Paper for Offset Printing

Products Used

The following products were used to produce the coating colors:
Additional polymer: Styrene-butadiene latex
Pigment 1: Calcium carbonate dispersion
Pigment 2: Kaolin dispersion
Lubricant: Stearate
Synthetic thickener: Polyacrylate
Optical brightener
Water
Aqueous sodium hydroxide solution at a concentration of 10 $mol \cdot l^{-1}$ The starches used in the coating colors are as follows:
Starch 1: Oxidized corn starch, sold for the preparation of coating colors.
Starch 2: Native waxy corn starch.
Starch 3: Waxy corn dextrin with a weight-average molecular weight equal to 300 kDa.
Starch 4: Corn dextrin with a weight-average molecular weight equal to 200 kDa.
Starch 5: Corn dextrin with a weight-average molecular weight equal to 20 kDa.
Starch 6: Waxy corn dextrin with a weight-average molecular weight equal to 1200 kDa.

Cooking of the Starches

A starch suspension is prepared by mixing the starch(es) (43% by weight) in water in an open vessel using a mixer and a deflocculator spindle. A steam tube is introduced into the vessel and the temperature gradually rises. The initial stirring is 700 rev/min. While the temperature increases, the starch begins to gelatinize; the stirring rate is then increased up to 1700 rev/min. Then, after bursting the starch, the speed is reduced again to 700 rev/min. The temperature reaches approximately 95° C. and is maintained at this value for 20 minutes. The solids content of the adhesive is 33%.

Preparation of the Color

The constituents of the colors according to the invention (I) and comparative colors (CP) are in the proportions appearing in table 1.

Each of the dispersions of pigments is homogenized beforehand and then the following protocol is carried out:

The constituents of the color are introduced and mixed in a mixer and in the proportions shown in table 1:
the dispersions of pigments over 10 minutes;
then the latex over 10 minutes;
then the cooked starch over 10 minutes;
then the remainder of the constituents over 10 minutes (additives, remainder of water and concentrated sodium hydroxide solution in order to adjust the pH to 9.5).

Five liters of each of the colors are thus prepared for the coating of paper and the rheological characterization.

The viscosities in mPa·s of Brookfield type, Hercules type (4400 revolutions/min, bob E) and ACAV type (measured at a frequency of 1 000 000 $s^{-1}$) also appear in this table.

The water retention capacity of the color (in $g/m^2$), also taken up in table 1 on the line entitled Gradek, along the coating process is determined using an AAGWR (Abo Akademy Gradek Water Retention) device.

TABLE 1

| Coating colors for offset printing paper | | | | | | |
|---|---|---|---|---|---|---|
| Color ref. | CP1 | CP2 | I3 | I4 | I5 | I6 |
| Latex (parts) | 7.5 | 7.5 | 7.5 | 7.5 | 7.5 | 6.5 |
| Starch 1 (parts) | 2 | 0 | 0 | 0 | 0 | 0 |
| Starch 2 (parts) | 0 | 0.2 | 0 | 0 | 0 | 0 |
| Starch 3 (parts) | 0 | 0 | 0 | 1 | 0 | 0 |
| Starch 4 (parts) | 0 | 0 | 0 | 0 | 1.5 | 2.25 |
| Starch 5 (parts) | 0 | 1.8 | 1 | 0 | 0 | 0 |
| Starch 6 (parts) | 0 | 0 | 1 | 1 | 0.5 | 0.75 |
| Pigment 1 (parts) | 80 | 80 | 80 | 80 | 80 | 80 |
| Pigment 2 (parts) | 20 | 20 | 20 | 20 | 20 | 20 |
| Optical brightener (parts) | 1.00 | 1.00 | 1.00 | 1.00 | 1.00 | 1.00 |
| Lubricant (parts) | 0.50 | 0.50 | 0.50 | 0.50 | 0.50 | 0.50 |
| Thickener (parts) | 0.10 | 0.10 | 0.10 | 0.10 | 0.10 | 0.10 |
| Solids content (%) | 65 | 65 | 65 | 65 | 65 | 65 |

TABLE 1-continued

Coating colors for offset printing paper

| Color ref. | CP1 | CP2 | I3 | I4 | I5 | I6 |
|---|---|---|---|---|---|---|
| pH | 9.5 | 9.5 | 9.5 | 9.5 | 9.5 | 9.5 |
| Brookfield visc. (mPa · s) | 700 | 610 | 600 | 580 | 540 | 620 |
| Hercules visc. (mPa · s) | 51 | 36 | 41 | 39 | 36 | 41 |
| ACAV visc. (mPa · s) | 59 | 54 | 52 | 50 | 48 | 51 |
| Gradek | 67 | 66 | 61 | 62 | 60 | 57 |

The CP1 color represents a coating color based on synthetic latex and on commercial starch.

The CP2 color represents a particularly preferred coating color described in the application WO 2011/131330 A1.

The colors according to the invention exhibit, with respect to the comparative colors, relatively similar viscosities, with a slight advantage for the colors according to the invention, which have lower ACAV viscosities. The ACAV viscosity is representative of the viscosity of the color during the coating of the paper. The lower the ACAV viscosity, the more the machine speed can be increased.

The colors according to the invention also exhibit a lower Gradek and thus a better ability to retain the water in the color during the process. This makes it possible to have a more stable coating process, as the need to readjust the solids content in the color during this process is reduced.

Preparation of the Papers

The coatings were carried out on a base paper, with a grammage of 42.5 g/m², using the Helicoater pilot plant, manufactured by Dixon, with a deposition of color of 11 g/m² approximately, the speed of the machine being 1200 m/min. Infrared drying is carried out using 14 lamps, each of 2000 W, and the drying time is 30 seconds.

The papers are subsequently calendered in one pass at 90° C. with a pressure of 220 daN/cm on a sheet-to-sheet calender from the manufacturer ABK.

The gloss of the papers obtained after calendering was measured according to the standard TAPPI T 480.

The whiteness D65 of the papers obtained after calendering was measured according to the standard TAPPI T 525.

The dry pick measurements were determined using an IGT AIC 2-5 device equipped with 50 mm rolls covered with a blanket, using an IGT 3804 ink, on paper test specimens of a size of 340×55 mm.

The ink is deposited on the rolls before transfer onto the paper. Transfer is carried out by applying a pressure of 625 N to the roll, the speed of the sample holder constantly accelerating and reaching a final speed of 2 m/s at the end of the sample.

The wet pick is measured according to the same protocol, apart from the difference that the speed of the sample holder is constant at 0.2 m/s and that transfer of water is carried out before transfer of the ink. This transfer is carried out using a first 38 mm screened roll and by applying a pressure of 400 N to this roll.

The characteristics of the papers obtained from the colors are described in detail in table 2 below.

TABLE 2

Characteristics of the offset papers

| TEST PAPERS | | CP1 | CP2 | I3 | I4 | I5 | I6 |
|---|---|---|---|---|---|---|---|
| Grammage | g/m² | 53 | 54 | 53 | 54 | 53 | 53 |
| Dry IGT | m/s | 1.14 | 1.19 | 1.15 | 1.16 | 1.15 | 1.15 |
| Wet IGT | % OD | 94 | 96 | 94 | 95 | 95 | 95 |

TABLE 2-continued

Characteristics of the offset papers

| TEST PAPERS | | CP1 | CP2 | I3 | I4 | I5 | I6 |
|---|---|---|---|---|---|---|---|
| Gloss | % | 62.73 | 64.97 | 65.47 | 66.01 | 66.53 | 62.20 |
| Whiteness SCE/0 | % | 77.15 | 77.41 | 77.18 | 77.75 | 77.45 | 77.65 |

Comparison of the papers according to the invention of tests 13, 14, and 15 with those of tests CP1 and CP2 shows that it is possible to improve, with identical amounts of starch, the gloss of the paper obtained. Test 16 shows that it is possible to increase the degree of replacement of latex while retaining properties which are still satisfactory.

Example 2: Manufacture of Paper for Heliogravure Printing

Products Used

The same products were used to produce the coating colors as for the coating colors of example 1, except that the styrene-butadiene latex was replaced with a styrene-acrylate latex and that a talc dispersion is also used (Pigment 3).

Manufacture of the Colors

The colors are manufactured by following the same protocol as that of example 1. The constituents of the comparative color (CP) and of the color according to the invention (I) are in the proportions appearing in table 3. The ACAV viscosity and the Gradek also appear in this table.

TABLE 3

Coating colors for heliogravure printing paper

| Color No. | CP8 | I9 |
|---|---|---|
| Latex (parts) | 3.4 | 3.4 |
| Starch 1 (parts) | 1 | 0 |
| Starch 3 (parts) | 0 | 0.75 |
| Starch 6 (parts) | 0 | 0.25 |
| Pigment 1 (parts) | 60 | 60 |
| Pigment 2 (parts) | 20 | 20 |
| Pigment 3 (parts) | 20 | 20 |
| Optical brightener (parts) | 0.50 | 0.50 |
| Lubricant (parts) | 0.60 | 0.60 |
| Thickener (parts) | 0.20 | 0.20 |
| Solids content (%) | 60 | 60 |
| pH | 9 | 9 |
| ACAV visc. (mPa · s) | 44 | 37 |
| Gradek | 96 | 92 |

It may be concluded that an improvement in the ACAV viscosity is again observed, which improvement is synonymous with an ability of the color to be used at a greater speed than the colors of the prior art.

Furthermore, the water retention of the color according to the invention is also improved.

The papers are manufactured according to the same protocol as that of example 1, apart from the following differences:

the grammage of the paper before coating is 38.5 g/m²;

the papers are calendered in one pass at 110° C. with a pressure of 220 daN/cm on a sheet-to-sheet calender from the manufacturer ABK.

The properties of the papers obtained are given in table 4.

TABLE 4

| Characteristics of the heliogravure papers | | | |
|---|---|---|---|
| TEST PAPER | | CP8 | I9 |
| Grammage | g/m2 | 50 | 49.5 |
| Dry IGT | m/s | 1.11 | 1.40 |
| Wet IGT | % OD | 96 | 96 |
| Gloss | % | 59.54 | 61.51 |
| Whiteness SCE/0 | % | 75.78 | 77.18 |

This test also shows that the gloss of the paper according to the invention and the strength of the coating layer of the latter are excellent.

The invention claimed is:

1. A coating color comprising:
at least one pigment,
water, and
a mixture of dextrins (A) and (B) having:
   between 30 and 90% by weight of dextrin (A), said dextrin (A) being composed of at least one dextrin with a weight-average molecular weight $M_A$ of less than 500 kDa; and
   between 10 and 70% by weight of dextrin (B), said dextrin (B) being composed of at least one dextrin with a weight-average molecular weight $M_B$;
the percentages by weight of dextrins being with respect to the total amount of the mixture of dextrins (A) and (B) in the composition, wherein $M_B$ is greater than $M_A+50$ kDa.

2. The coating color as claimed in claim 1, wherein $M_A$ is between 5 kDa and 400 kDa.

3. The coating color as claimed in claim 1, wherein $M_A$ is between 10 kDa and 350 kDa.

4. The coating color as claimed in claim 1, wherein $M_B$ is between 550 kDa and 5000 kDa.

5. The coating color as claimed in claim 1, wherein $M_B$ is between 1000 kDa and 2500 kDa.

6. The coating color as claimed in claim 1, wherein, with respect to the total amount of the mixture of dextrins (A) and (B),
the amount by weight of dextrin (A) is between 70 and 80% and
the amount by weight of dextrin (B) is between 20 and 30%.

7. The coating color as claimed in claim 1, wherein the dextrin (B) is composed of at least one waxy dextrin.

8. The coating color as claimed claim 1, further comprising at least one additional binding polymer selected from the group consisting of styrene polymers, (meth)acrylic or (meth)acrylate polymers, saponified or nonsaponified polyvinyl acetates, and protein binders.

9. The coating color as claimed in claim 1, wherein the coating color comprises, per 100 parts of pigments, from 0.5 to 200 parts of mixture of dextrins (A) and (B) and optionally from 0 to 100 parts of additional polymer, the sum of the parts of the mixture of dextrins (A) and (B) and of optional additional polymer ranging from 0.5 to 200 parts.

10. The coating color as claimed in claim 1, wherein the coating color comprises, per 100 parts of pigments, from 0.5 to 25 parts of mixture of dextrins (A) and (B) and from 1 to 15 parts of additional polymer, the sum of the parts of the mixture of dextrins (A) and (B) and of additional polymer ranging from 2 to 30 parts.

11. The coating color as claimed in claim 1, wherein the coating color has a pH ranging from 8 to 10.5.

12. The coating color as claimed in claim 1, wherein the coating color has solids content is between 40 and 85%.

13. The coating color as claimed in claim 1, wherein the coating color exhibits a viscosity selected from the group consisting of Brookfield viscosity ranging from 500 to 2000 mPa·s, a Hercules viscosity ranging from 40 to 90 mPa·s, an ACAV viscosity ranging from 30 to 80 mPa·s and combinations thereof.

14. A process for coating paper, comprising at least one step of coating a paper with the coating color as claimed in claim 1.

15. A coated paper obtained from the process as claimed in claim 14 comprising the coating color.

16. The paper as claimed in claim 15, wherein the paper comprises from 1 to 5 coating layers, at least one of which is obtained from the coating color.

17. A process for printing a coated paper as claimed in claim 15, comprising printing by offset, heliogravure, rotogravure, lithogravure, inkjet or flexography printing.

* * * * *